US009473984B2

(12) United States Patent
Xu et al.

(10) Patent No.: US 9,473,984 B2
(45) Date of Patent: Oct. 18, 2016

(54) METHOD AND APPARATUS FOR CONTROLLING CONGESTION IN WIRELESS COMMUNICATION SYSTEM

(71) Applicant: Samsung Electronics Co. Ltd., Suwon-si, Gyeonggi-do (KR)

(72) Inventors: Jiangwei Xu, Suwon-si (KR); Sang-Jun Moon, Seoul (KR); Yong-Seok Park, Seoul (KR); Chul-Ki Lee, Seoul (KR); Jung-Hwan Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 367 days.

(21) Appl. No.: 13/902,075

(22) Filed: May 24, 2013

(65) Prior Publication Data

US 2013/0315066 A1 Nov. 28, 2013

(30) Foreign Application Priority Data

May 25, 2012 (KR) .................. 10-2012-0056171

(51) Int. Cl.
| | |
|---|---|
| *H04W 28/12* | (2009.01) |
| *H04W 28/02* | (2009.01) |
| *H04W 28/14* | (2009.01) |
| *H04L 29/08* | (2006.01) |
| *H04L 12/841* | (2013.01) |
| *H04L 12/823* | (2013.01) |

(Continued)

(52) U.S. Cl.
CPC ............ *H04W 28/12* (2013.01); *H04L 1/0002* (2013.01); *H04L 47/28* (2013.01); *H04L 47/32* (2013.01); *H04L 67/2842* (2013.01); *H04L 67/325* (2013.01); *H04L 69/28* (2013.01); *H04W 28/0289* (2013.01); *H04W 28/14* (2013.01)

(58) Field of Classification Search
CPC ........... H04W 28/10; H04W 28/0273; H04W 72/1221; H04W 72/1247; H04W 72/1242; H04L 47/10; H04L 47/28; H04L 47/26; H04L 47/263; H04L 47/266; H04L 67/28
See application file for complete search history.

(56) References Cited

U.S. PATENT DOCUMENTS

| | | | | |
|---|---|---|---|---|
| 6,055,578 A | * | 4/2000 | Williams et al. ............ | 709/253 |
| 2002/0110084 A1 | * | 8/2002 | Butt et al. .................... | 370/230 |
| 2004/0221056 A1 | * | 11/2004 | Kobayashi .................... | 709/232 |

(Continued)

FOREIGN PATENT DOCUMENTS

WO 2009/045945 A2 4/2009

OTHER PUBLICATIONS

"A Proxy-Based Adaptive Flow Control Scheme for Media Streaming" ACM symposium Mar. 10-14, 2002; Huang et al.*

(Continued)

*Primary Examiner* — Hassan Kizou
*Assistant Examiner* — Hector Reyes Ortiz
(74) *Attorney, Agent, or Firm* — Jefferson IP Law, LLP

(57) ABSTRACT

A method of controlling congestion in a base station of a wireless communication system is provided. The method includes receiving a Service Data Unit (SDU) that includes pieces of data forwarded through a caching proxy, driving a timer each time an SDU is received for processing the SDU using a communication protocol, determining whether the SDU has been processed using the communication protocol until expiration of the timer, and controlling a transmission rate of the caching proxy based on a number of SDUs consecutively discarded or a number of SDUs consecutively transmitted depending on whether the timer has expired.

20 Claims, 5 Drawing Sheets

(51) Int. Cl.
*H04L 29/06* (2006.01)
*H04L 1/00* (2006.01)

(56) References Cited

U.S. PATENT DOCUMENTS

| | | | |
|---|---|---|---|
| 2008/0120424 A1* | 5/2008 | Deshpande | 709/230 |
| 2009/0116426 A1* | 5/2009 | Ho | 370/328 |
| 2009/0276518 A1* | 11/2009 | Burkard et al. | 709/224 |
| 2010/0034187 A1* | 2/2010 | Kumar et al. | 370/345 |
| 2010/0315948 A1* | 12/2010 | Yi et al. | 370/235 |
| 2011/0188377 A1* | 8/2011 | Kim et al. | 370/235 |
| 2014/0359048 A1* | 12/2014 | Vikberg et al. | 709/213 |

OTHER PUBLICATIONS

Ericsson, XP002519093—"Report from off-line discussions on SDU Discard functionality, Tdoc R2-075237", 4.4.1, #3GPP TSG-RAN WG2 #60, Jeju, Korea, Nov. 5-9, 2007.

Pu, Zou, and Chen, XP032197403—"Video Adaptation Proxy for Wireless Dynamic Adaptive Streaming over HTTP", Proceedings of 2012 IEEE 19th International Packet Video Workshop, Munich, Germany, May 10-11, 2012.

* cited by examiner

METHOD AND APPARATUS FOR CONTROLLING CONGESTION IN WIRELESS COMMUNICATION SYSTEM

PRIORITY

This application claims the benefit under 35 U.S.C. §119(a) of a Korean patent application filed on May 25, 2012 in the Korean Intellectual Property Office and assigned Serial No. 10-2012-0056171, the entire disclosure of which is hereby incorporated by reference.

BACKGROUND OF THE INVENTION

1. Field of the Invention

The present invention relates to a method and apparatus for controlling congestion in a wireless communication system. More particularly, the present invention relates to a method and apparatus for enabling a base station to control congestion using a caching proxy.

2. Description of the Related Art

Voice call service-oriented Wireless communication systems are evolving to high-speed and high-quality wireless packet data communication systems that provide data and multimedia services. Various standards for wireless communication, such as the recent 3rd Generation Partnership Project (3GPP) based High-Speed Downlink Packet Access (HSDPA), High-Speed Uplink Packet Access (HSUPA), Long Term Evolution (LTE), LTE Advanced (LTE-A), 3GPP2 High Rate Packet Data (HRPD), IEEE 802.16, and the like were developed to support high-speed and high-quality wireless packet data transmission services.

LTE systems were developed to efficiently support high-speed wireless packet data transmission, maximizing wireless system capabilities using various wireless access technologies. LTE-A systems are advanced versions of LTE systems and have improved capabilities of data transmission compared with LTE systems. For convenience of explanation, LTE and LTE-A systems will be herein collectively referred to as LTE systems.

In the LTE system, a general network structure for data exchange with an Internet Protocol (IP) network may be understood as an Evolved Packet System (EPS) defined in 3GPP, and an amount of mobile traffic, such as web-based content exchanged between the IP network and EPS, has rapidly increased as popularity of smartphones spread.

Accordingly, many technologies have been developed and implemented for a base station in the LTE system to increase transmission rate of web content. One of those technologies is implemented by a base station of the LTE system to reduce a transmission time for data, such as web content between the LTE system and the IP network, such as the Internet, by using a caching proxy as a local cache. A base station that uses the caching proxy will now be called a caching evolved Node B (eNB).

Web content or data to be transmitted downlink from the IP network to a User Equipment (UE) via the caching eNB of the LTE system is sent to a Packet Data Convergence Protocol (PDCP) through a proxy layer in a protocol stack of the caching eNB. The proxy layer caches data transmitted downlink from the IP network (e.g., the Internet) and sends the data to the PDCP layer. The proxy layer caches data transmitted uplink from the PDCP layer and transmits the data to the IP network. The data sent through the proxy layer may be used in the IP network, such as HyperText Transfer Protocol (HTTP) based data.

Taking the LTE system as an example, the PDCP layer compresses header information of IP packets exchanged between the EPS and the IP network to increase data transmission efficiency. The PDCP layer serves to forward PDCP Packet Data Units (PDUs) (hereinafter referred to as "PDUs") to a Radio Link Control (RLC) layer, the PDUs being formed by performing known PDCP processing, such as header compression (for user-plane data), integrity processing (for control-plane data), ciphering, header addition of the PDCP layer, and the like, on IP packets (e.g., PDCP Service Data Units (SDUs) (hereinafter referred to as "SDUs")) sent from the proxy layer in downlink. The PDCP also decompresses headers of the PDUs sent from the RLC layer in uplink, reconstructs the headers of the PDUs into SDUs, and forwards the SDUs to an upper layer.

In the LTE system, an eNB typically includes PDCP entities that serve as the PDCP layer. When a delay occurs in a PDCP process of configuring a PDU with an SDU received in downlink and forwarding the PDU, the PDCP entity discards the SDU. With respect to such an operation of discarding an SDU, the PDCP entity uses a discard timer that counts delayed time.

The PDCP entity drives the discard timer each time an SDU is received, and discards the SDU if the PDCP processing for the SDU has not been completed for some reason until expiration of the discard timer. However, because the discard timer is driven each time an SDU is received, if the discard timer happens to expire frequently due to bad network conditions, the PDCP entity operates inefficiently and thus causes traffic congestion.

Therefore, a need exists for a method and apparatus for enabling a base station to control congestion using a caching proxy in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and apparatus for enabling a base station to control congestion using a caching proxy in a wireless communication system.

Another aspect of the present invention is to provide a method and apparatus for enabling a base station to control congestion by controlling transmission rate of a caching proxy in a wireless communication system.

In accordance with an aspect of the present invention, a method of controlling congestion in a base station of a wireless communication system is provided. The method includes receiving a Service Data Unit (SDU) that includes pieces of data forwarded through a caching proxy, driving a timer each time an SDU is received for processing the SDU using a communication protocol, determining whether the SDU has been processed using the communication protocol until expiration of the timer, and controlling a transmission rate of the caching proxy based on a number of SDUs consecutively discarded or a number of SDUs consecutively transmitted depending on whether the timer has expired.

In accordance with another aspect of the present invention, a base station that controls congestion in a wireless communication system is provided. The base station includes a protocol processor for driving a timer each time a Service Data Unit (SDU) that includes pieces of data is received and processing the SDU using a communication protocol, and a controller for determining whether the SDU has been processed using the communication protocol until expiration of the timer, and for controlling a transmission rate of a caching proxy that caches data forwarded from a network based on a number of SDUs consecutively discarded or a number of SDUs consecutively transmitted depending on whether the timer has expired.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings in which.

Throughout the drawings, like reference numerals will be understood to refer to like parts, components, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Exemplary embodiments of the present invention may include, among others, a 3rd Generation Partnership Project (3GPP) based communication system (e.g., High Speed Downlink Packet Access (HSDPA), High Speed Uplink Packet Access (HSUPA), Long Term Evolution (LTE), and the like) that processes data forwarded from an Internet Protocol (IP) network and that performs Packet Data Convergence Protocol (PDCP) processing, such as header compression, and the like, using a caching proxy. However, exemplary embodiments of the present invention may include any other wireless communication system having a base station that uses a caching proxy for data exchange with the IP network. Congestion control operations for downlink according to exemplary embodiments of the present invention will be described below.

Figure 1:
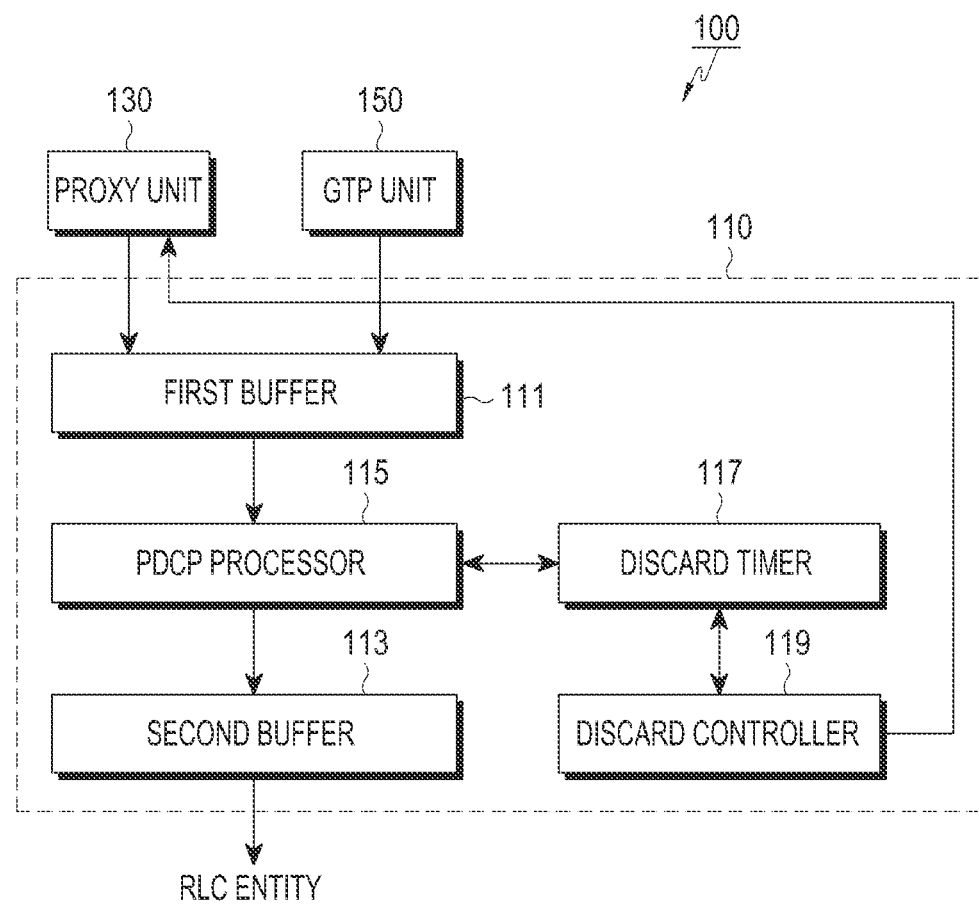
FIG. 1 is a block diagram of a base station to control congestion in a wireless communication system according to an exemplary embodiment of the present invention.

FIG. 1 is a block diagram of a base station to control congestion in a wireless communication system according to an exemplary embodiment of the present invention.

Referring to FIG. 1, a base station 100 includes a PDCP unit 110, a proxy unit 130, and a General Packet Radio Service (GPRS) Tunneling Protocol (GTP) unit 150.

The PDCP unit 110 performs known PDCP processing, such as header compression (e.g., for user-plane data), integrity processing (e.g., for control-plane data), ciphering, header addition of a PDCP layer, and the like on IP packets (e.g., Service Data Units (SDUs) forwarded from an IP network through the proxy unit 130 or the GTP unit 150). The PDCP unit 110 controls transmission rate of IP packets cached in and forwarded from the proxy unit 130 to be increased or decreased as a result of comparing the number of SDUs consecutively discarded or the number of SDUs not discarded but consecutively transmitted with a predetermined threshold using a discard timer 117.

The proxy unit 130 caches HTTP-based IP packets (e.g., web content transmitted from the IP network), and forwards the IP packets to the PDCP unit 110 while increasing, decreasing, or maintaining transmission rate of the IP packets being forwarded to the PDCP unit 110 under control of the PDCP unit 110. The GPT unit 150 receives data (e.g., non-HTTP-based data) from a core network of a wireless communication system (e.g., an Evolved Packet Core (EPC) of an LTE system) and forwards the data to the PDCP unit 110.

The GPT unit 150 is illustrated to show that the base station of FIG. 1 is capable of receiving and processing non-HTTP-based data from the EPC.

As illustrated in FIG. 1, the PDCP unit 110 includes a first buffer 111, a second buffer 113, a PDCP processor 115, the discard timer 117, and a discard controller 119.

The first buffer 111 temporarily stores data forwarded from the proxy unit 130 or the GTP unit 150 for PDCP processing. The second buffer 113 temporarily stores resultant data of the PDCP processing and forwards the resultant data to an RLC entity that covers a lower layer of the PDCP layer. According to exemplary embodiments of the present invention, the first buffer 111 and the second buffer 113 may respectively be implemented as one or multiple buffers.

The discard timer 117 is driven each time an SDU is received from the proxy unit 130 and counts predetermined processing time for each SDU, under control of the PDCP processor 115 or the discard controller 119. According to exemplary embodiments of the present invention, the discard timer 117 may count a respective processing time of each SDU.

The discard controller 119 counts the number of SDUs consecutively discarded until expiration of the discard timer 117 (hereinafter, referred to as "discard count"), and sends a warning message (or alert message) to the proxy unit 130 if the discard count exceeds a predetermined threshold. Upon receiving the warning message, the proxy unit 130 gradually decreases transmission rate of IP packets to be forwarded to the PDCP unit 110.

If the number of SDUs consecutively discarded exceeds the predetermined threshold, occurrence of traffic congestion may be implied (or assumed). If traffic congestion occurs, reducing the transmission rate of the proxy unit 130 may lead to reduction of the number of SDUs discarded in the PDCP unit 110. Accordingly, the base station may efficiently control the traffic congestion.

The discard controller 119 counts the number of SDUs not discarded but consecutively transmitted until expiration of the discard timer 117 (hereinafter, referred to as "transmit count"), and sends a release message to the proxy unit 130 if the transmit count exceeds a predetermined threshold (e.g., which may be different from the predetermined threshold to which the discard count is compared). Upon receiving the release message, the proxy unit 130 gradually increases transmission rate of IP packets to be forwarded to the PDCP unit 110.

If the number of SDUs consecutively transmitted exceeds the predetermined threshold, resolution or continuing resolution (e.g., being in the process of resolving) of traffic congestion may be implied (or assumed). If traffic congestion has been resolved or is being resolved, increasing the transmission rate of the proxy unit 130 may lead to an increase in the number of SDUs consecutively transmitted and may enable the PDCP unit 110 to process the SDUs consecutively transmitted without discarding. Accordingly, the base station may efficiently control the traffic congestion.

Figure 2A:
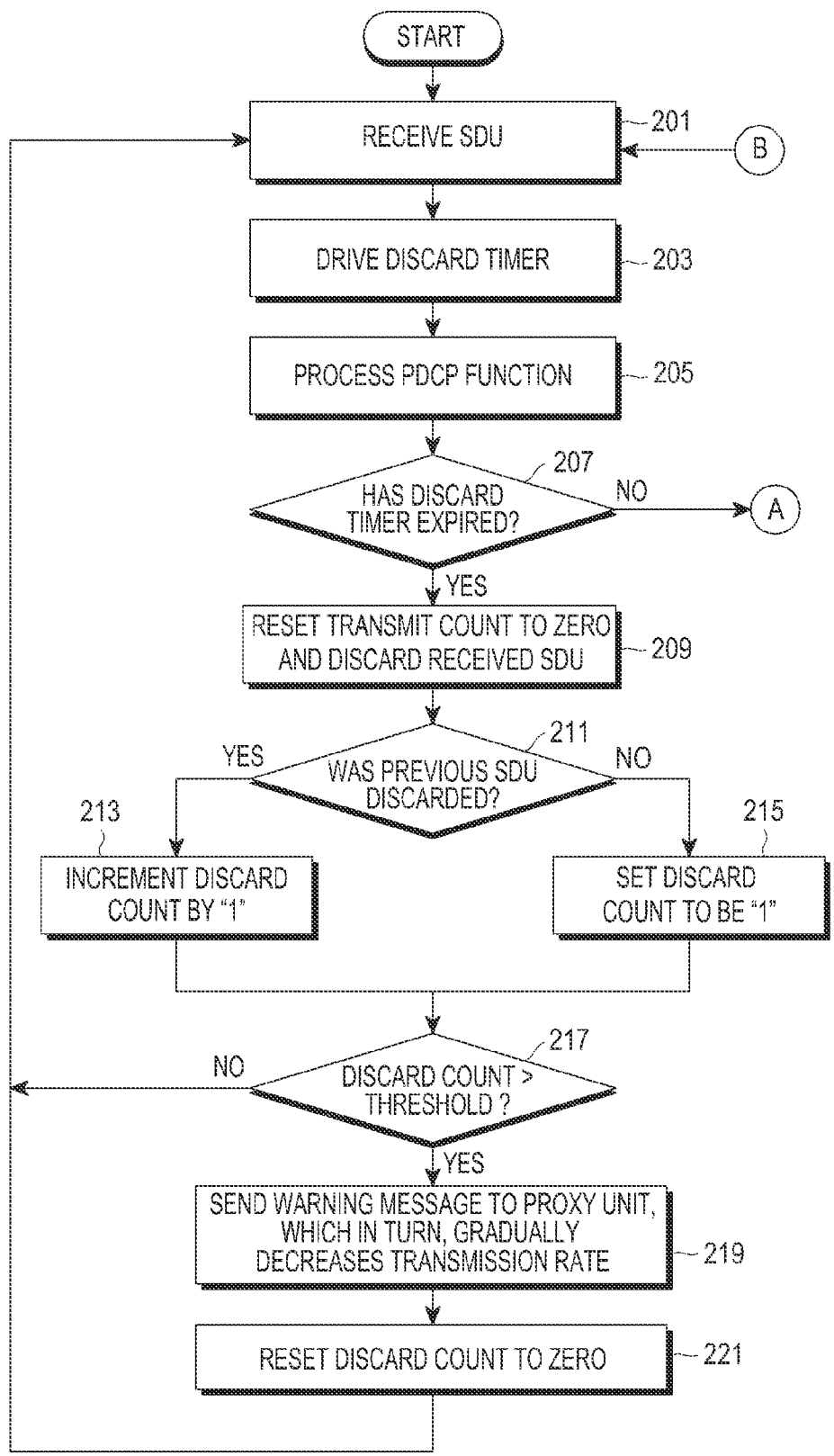
FIGS. 2A and 2B are flowcharts illustrating a method of enabling a base station to control congestion by controlling transmission rate from a caching proxy to a Packet Data Convergence Protocol (PDCP) layer according to an exemplary embodiment of the present invention.
Figure 2B:
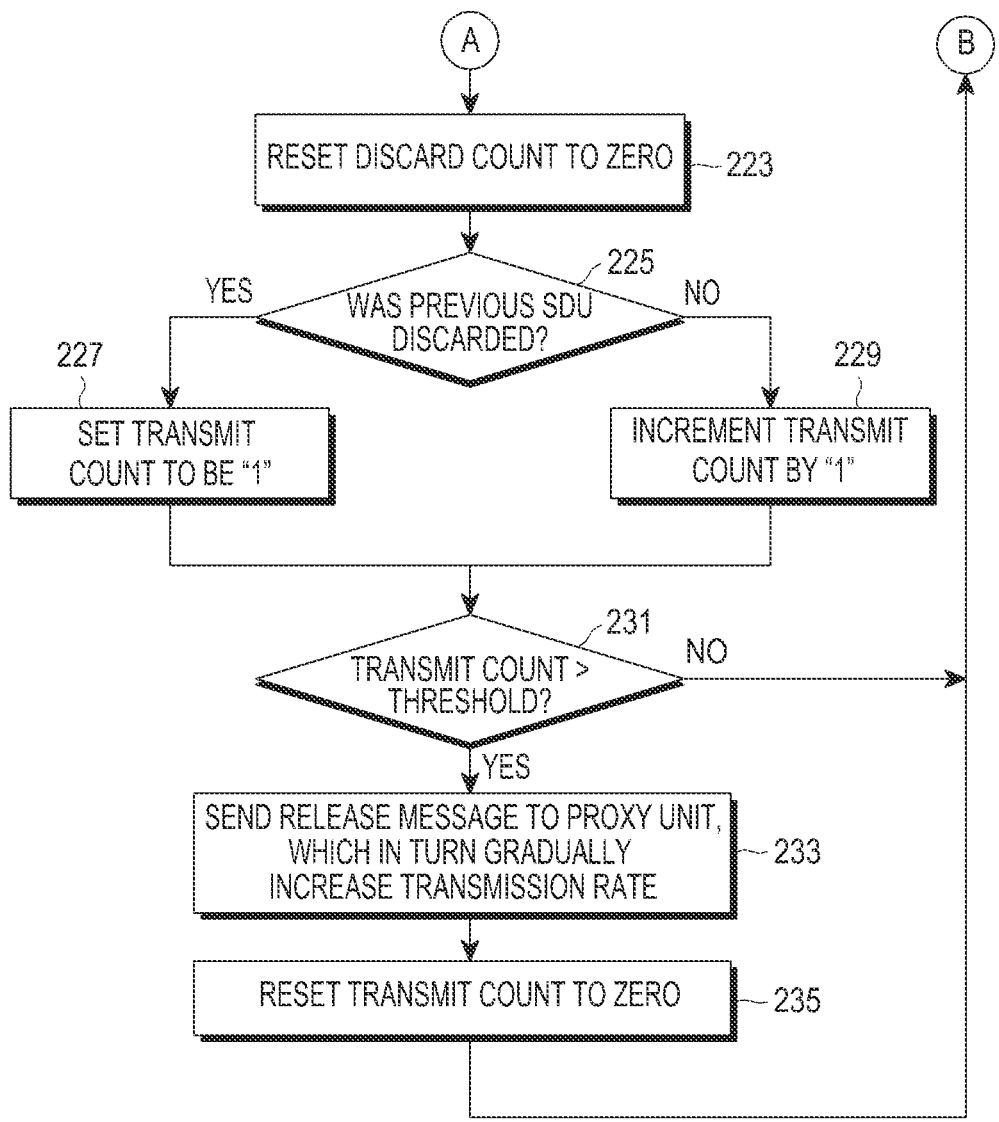

FIGS. 2A and 2B are flowcharts illustrating a method of enabling a base station to control congestion by controlling transmission rate from a caching proxy to a PDCP layer according to an exemplary embodiment of the present invention.

Referring to FIGS. 2A and 2B, in step 201, the PDCP unit 110 of the base station receives IP packets (e.g., SDUs forwarded from an IP network through the proxy unit 130).

In step 203, the PDCP unit 110 drives the discard timer 117 each time an SDU is received.

Thereafter, in step 205 the PDCP unit 110 performs PDCP processing, such as header compression, integrity processing, ciphering, header addition of the PDCP layer, and the like on each received SDU.

In step 207, the PDCP unit 110 determines whether the discard timer 117 has expired for the SDU in parallel with the PDCP processing.

If the PDCP unit 110 determines that the discard timer 117 has expired for the SDU (e.g., that PDCP processing for the SDU has not been completed until expiration of the discard timer 117), then base station proceeds to step 209 in which the PDCP unit 110 resets transmit count to zero and discards the SDU.

Thereafter, in step 211, the PDCP unit 110 determines whether a previously received SDU was discarded as well.

If the PDCP unit 110 determines that the previous SDU was discarded in step 211, then the base station proceeds to step 213 in which the PDCP unit 110 increments the discard count by one (or gradually). In contrast, if the PDCP unit 110 determines that the previous SDU was not discarded in step 211, then the base station proceeds to step 215 in which the PDCP unit 110 sets the discard count to be '1'.

Thereafter, in step 217, the PDCP unit 110 determines whether the discard count exceeds a predetermined threshold. If the PDCP unit 110 determines that the discard count exceeds the predetermined threshold, then the base station proceeds to step 219 in which the PDCP unit 110 to send the proxy unit 130 a warning message for transmission rate control. Upon receiving the warning message, the proxy unit 130 gradually decreases transmission rate of IP packets to be forwarded to the PDCP unit 110.

In step 221, the PDCP unit 110 resets the discard count to zero. Thereafter, the PDCP unit 110 returns to step 201 for a next received SDU.

If the PDCP unit 110 determines that the discard timer has not expired for the SDU, (e.g., that PDCP processing for the SDU has been completed correctly until expiration of the discard timer 117) in step 207, then base station proceeds to step 223 in which the PDCP unit 110 resets discard count to zero.

Thereafter, in step 225, the PDCP unit 110 then determines whether a previously received SDU was discarded.

If the PDCP unit 110 determines that the previous SDU was discarded in step 225, then the base station proceeds to step 227 in which the PDCP unit 110 sets the transmit count to be '1'. In contrast, if the PDCP unit 110 determines that the previous SDU was not discarded in step 225, then the base station proceeds to step 229 in which the PDCP unit 110 increments the transmit count by one (or gradually).

In step 231, The PDCP unit 110 determines whether the transmit count exceeds a predetermined threshold. If the PDCP unit 110 determines that the transmit count does not exceed the predetermined threshold, then the base station returns to step 201. In contrast, if the PDCP unit 110 determines that the transmit count exceeds the predetermined threshold in step 231, then the base station proceeds to step 233 in which the PDCP unit 110 sends the proxy unit 130 a release message for transmission rate control. Upon receiving the release message, the proxy unit 130 gradually increases transmission rate of IP packets to be forwarded to the PDCP unit 110.

In step 235, the PDCP unit 110 resets the transmit count to zero. Thereafter, the base station returns to step 201 for a next received SDU.

Figure 3:
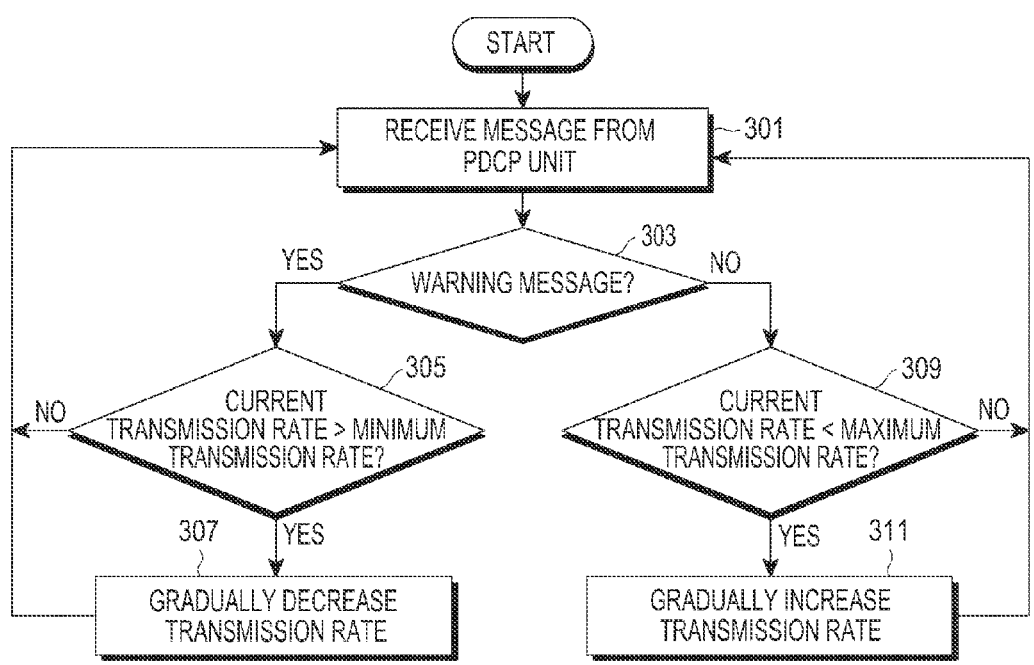
FIG. 3 is a flowchart illustrating a method of enabling a base station to control transmission rate of a caching proxy according to an exemplary embodiment of the present invention.

FIG. 3 is a flowchart illustrating a method of enabling a base station to control transmission rate of a caching proxy according to an exemplary embodiment of the present invention.

Referring to FIG. 3, the flowchart further illustrates steps 219 and 233 of FIG. 2A (e.g., operations of the proxy unit 130 to receive the warning message or the release message from the PDCP unit 110).

As illustrated in FIG. 3, in step 301, the proxy unit receives a message from the PDCP unit 110.

In step 303, the proxy unit 130 determines whether the message received from the PDCP unit 110 corresponds to a warning message or a release message.

If the proxy unit 130 determines that the message corresponds to the warning message in step 303, the base station proceeds to step 305 in which the proxy unit 130 determines whether a current transmission rate of IP packets to be forwarded to the PDCP unit 110 is greater than a set minimum transmission rate. If the proxy unit 130 determines that the current transmission rate of IP packets to be forwarded to the PDCP unit 110 is greater than the set minimum transmission rate in step 305, then the base station proceeds to step 307 in which the proxy unit 130 gradually decreases transmission rate. In contrast, if the proxy unit 130 determines that the current transmission rate is not greater than the set minimum transmission rate in step 305, then the current transmission rate corresponds to the minimum transmission rate and thus, the proxy unit 130 maintains the current transmission rate and may proceed to step 301 or may perform other different setting operations, such as giving up transmission, decreasing the minimum transmission rate, or the like according to a scheme determined by the system.

In contrast, if the proxy unit 130 determines that the received message corresponds to the release message in step 303, then the base station proceeds to step 309 in which the proxy unit 130 determines whether the current transmission rate is less than a set maximum transmission rate. If the proxy unit 130 determines that the current transmission rate is less than a set maximum transmission rate, then the base station proceeds to step 311 in which the proxy unit 130 gradually increases the transmission rate. In contrast, if the proxy unit 130 determines that the current transmission rate is not less than the set maximum transmission rate in step 309, then the current transmission rate corresponds to the maximum transmission rate and thus, the proxy unit 130 maintains the current transmission rate and may proceed to step 301 or perform other different setting operations, such as increasing the maximum transmission rate or the like.

Figure 4:
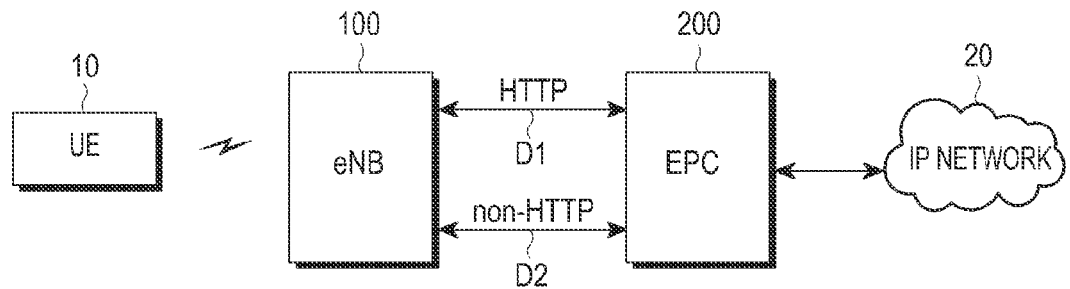
FIG. 4 is a schematic diagram of a wireless communication system including a base station that controls congestion according to an exemplary embodiment of the present invention.

FIG. 4 is a schematic diagram of a wireless communication system including a base station to control congestion according to an exemplary embodiment of the present invention.

Referring to FIG. 4, in a wireless communication system that represents an LTE system as an example, HTTP-based data D1, such as web content transmitted in downlink from an IP network 20 to a UE 10 via an Evolved Packet Core (EPC) 200 and the base station (evolved Node B (eNB)) 100 is forwarded to a PCDP layer through a proxy layer in the eNB 100. In contrast, non-HTTP-based data D2 transmitted to the UE 10 through the EPC 200 and the eNB 100 is forwarded to the PDCP layer through a General Packet Radio Service (GPRS) Tunneling Protocol (GTP) layer in the base station 100. In the PDCP layer of the base station 100, an SDU received from the proxy layer (e.g., the caching proxy) is subject to PDCP processing, and a congestion controlling method is performed by controlling transmission rate of the caching proxy.

Figure 5:
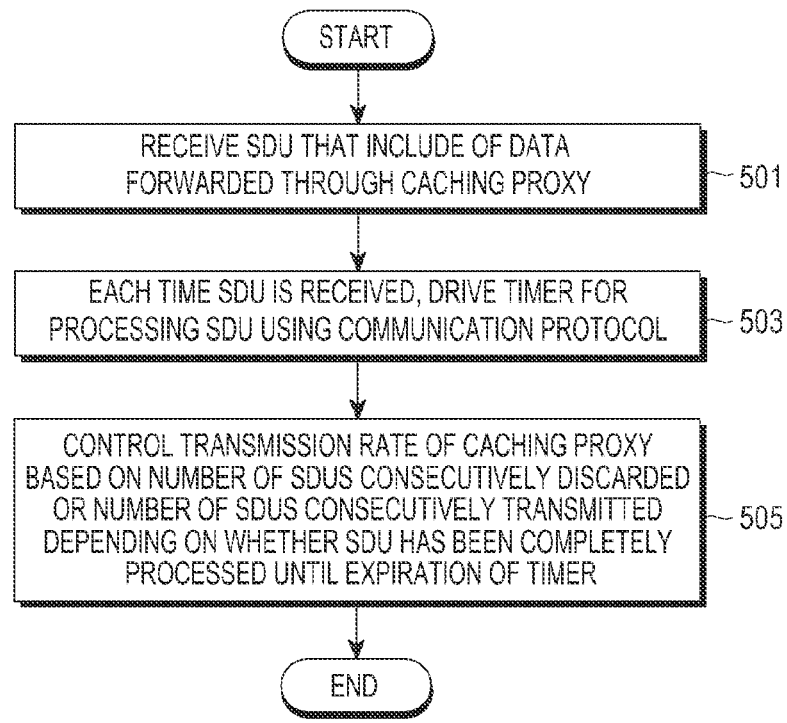
FIG. 5 is a flowchart illustrating a method of enabling a base station to control congestion according to an exemplary embodiment of the present invention.

FIG. 5 is a flowchart illustrating a method of enabling a base station to perform congestion control according to an exemplary embodiment of the present invention.

Referring to FIG. 5, in step 501, a base station receives an SDU that includes pieces of data forwarded through a caching proxy.

In step 503, each time an SDU is received, the base station drives a timer for processing the SDU using a communication protocol.

In step 505, the base station controls transmission rate of the caching proxy based on the number of SDUs consecutively discarded or consecutively transmitted depending on whether the processing of the SDU using the communication protocol has been completed until expiration of the timer.

According to exemplary embodiments of the present invention, the base station may control transmission rate of the caching proxy as follows: the base station reduces transmission rate of the caching proxy if the number of SDUs consecutively discarded exceeds a predetermined threshold, and increases transmission rate of the caching proxy if the number of SDUs consecutively transmitted exceeds a predetermined threshold.

It will be appreciated that exemplary embodiments of the present invention according to the claims and description in the specification can be realized in the form of hardware, software or a combination of hardware and software.

Any such software may be stored in a non-transitory computer readable storage medium. The non-transitory computer readable storage medium stores one or more programs (software modules), the one or more programs comprising instructions, which when executed by one or more processors in an electronic device, cause the electronic device to perform a method of the present invention.

Any such software may be stored in the form of volatile or non-volatile storage such as, for example, a storage device like a Read Only Memory (ROM), whether erasable or rewritable or not, or in the form of memory such as, for example, Random Access Memory (RAM), memory chips, device or integrated circuits or on an optically or magnetically readable medium such as, for example, a Compact Disk (CD), Digital Versatile Disc (DVD), magnetic disk or magnetic tape or the like. It will be appreciated that the storage devices and storage media are exemplary embodiments of machine-readable storage that are suitable for storing a program or programs comprising instructions that, when executed, implement exemplary embodiments of the present invention. Accordingly, exemplary embodiments provide a program comprising code for implementing apparatus or a method as claimed in any one of the claims of this specification and a machine-readable storage storing such a program.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method of controlling congestion in a base station of a wireless communication system, the method comprising:
   receiving data of a service data unit (SDU) from a caching proxy;
   driving a timer for processing the SDU using a communication protocol;
   determining a number of SDUs consecutively discarded or a number of SDUs consecutively transmitted, based on whether the SDU has been processed until expiration of the timer; and
   controlling a transmission rate of the caching proxy based on the number of SDUs consecutively discarded or the number of SDUs consecutively transmitted.

2. The method of claim 1, wherein the communication protocol comprises a packet data convergence protocol (PDCP) by which to configure a packet data unit (PDU) with the SDU and to send the PDU to a lower layer.

3. The method of claim 1, wherein the controlling of the transmission rate of the caching proxy comprises decreasing the transmission rate of the caching proxy if the number of SDUs consecutively discarded exceeds a predetermined threshold.

4. The method of claim 3, wherein the controlling of the transmission rate of the caching proxy comprises increasing the transmission rate of the caching proxy if the number of SDUs consecutively transmitted exceeds a predetermined threshold, and
   wherein the predetermined threshold to which the number of SDUs consecutively transmitted is compared is different from the predetermined threshold to which the number of SDUs consecutively discarded is compared.

5. The method of claim 1, wherein the controlling of the transmission rate of the caching proxy comprises increasing the transmission rate of the caching proxy if the number of SDUs consecutively transmitted exceeds a predetermined threshold.

6. The method of claim 1, wherein the controlling of the transmission rate of the caching proxy comprises sending the caching proxy a message to control the transmission rate of the caching proxy based on at least one of the number of SDUs consecutively discarded and the number of SDUs consecutively transmitted.

7. The method of claim 6, further comprising decreasing the transmission rate of the caching proxy if the message corresponds to a warning message based on the SDUs consecutively discarded and if the transmission rate of the caching proxy is greater than a set minimum transmission rate.

8. The method of claim 6, further comprising increasing the transmission rate of the caching proxy if the message corresponds to a release message based on the SDUs consecutively transmitted and if the transmission rate of the caching proxy is less than a set maximum transmission rate.

9. The method of claim 1, wherein the data received from the caching proxy comprises hyper text transfer protocol (HTTP)-based data in an internet protocol (IP) network.

10. A non-transitory computer-readable storage medium storing instructions, that when executed, causes at least one processor to perform the method of claim 1.

11. A base station for controlling congestion in a wireless communication system, the base station comprising:
a controller configured to:
drive a timer for processing a service data unit (SDU) received from a caching proxy using a communication protocol,
determine a number of SDUs consecutively discarded or a number of SDUs consecutively transmitted, based on whether the SDU has been processed until expiration of the timer, and
control a transmission rate of a caching proxy based on the number of SDUs consecutively discarded or the number of SDUs consecutively transmitted.

12. The base station of claim 11, wherein the communication protocol comprises a packet data convergence protocol (PDCP) by which to configure a packet data unit (PDU) with the SDU and to send the PDU to a lower layer.

13. The base station of claim 11, wherein the controller is configured to control to decrease the transmission rate of the caching proxy if the number of SDUs consecutively discarded exceeds a predetermined threshold.

14. The base station of claim 11, wherein the controller is configured to control to increase the transmission rate of the caching proxy if the number of SDUs consecutively transmitted exceeds a predetermined threshold.

15. The base station of claim 11, wherein the controller is configured to control to send a message to control the transmission rate of the caching proxy to the caching proxy based on at least one of the number of SDUs consecutively discarded and the number of SDUs consecutively transmitted.

16. The base station of claim 11, wherein the caching proxy is included in the base station.

17. The base station of claim 11, wherein the caching proxy is included in a network entity located between the base station and a network.

18. The base station of claim 15, wherein the caching proxy decreases the transmission rate if the received message corresponds to a warning message and if the transmission rate is greater than a set minimum transmission rate.

19. The base station of claim 15, wherein the caching proxy increases the transmission rate if the received message corresponds to a release message and if the transmission rate is less than a set maximum transmission rate.

20. The base station of claim 11, wherein data received from the caching proxy comprises hyper text transfer protocol (HTTP)-based data in an internet protocol (IP) network.

* * * * *